United States Patent
Jia et al.

(10) Patent No.: US 9,258,759 B2
(45) Date of Patent: *Feb. 9, 2016

(54) MOBILE INTERNET SERVICE SYSTEM FOR LONG DISTANCE TRAINS

(71) Applicant: CITY UNIVERSITY OF HONG KONG, Hong Kong (HK)

(72) Inventors: Weijia Jia, Hong Kong (HK); Fung Po Tso, Hong Kong (HK)

(73) Assignee: CITY UNIVERSITY OF HONG KONG, Hong Kong (HK)

(*) Notice: Subject to any disclaimer, the term of this patent is extended or adjusted under 35 U.S.C. 154(b) by 0 days.

This patent is subject to a terminal disclaimer.

(21) Appl. No.: 14/284,311

(22) Filed: May 21, 2014

(65) Prior Publication Data

US 2014/0254378 A1 Sep. 11, 2014

Related U.S. Application Data

(63) Continuation of application No. 13/399,875, filed on Feb. 17, 2012, now Pat. No. 8,737,225.

(51) Int. Cl.
*H04W 40/14* (2009.01)
*H04L 12/707* (2013.01)
*H04L 29/08* (2006.01)
(Continued)

(52) U.S. Cl.
CPC ............... *H04W 40/14* (2013.01); *H04L 45/22* (2013.01); *H04L 45/24* (2013.01); *H04L 67/1002* (2013.01); *H04W 28/0236* (2013.01); *H04W 84/005* (2013.01)

(58) Field of Classification Search
CPC ..... H04L 45/22; H04L 45/24; H04L 67/1002; H04W 40/14; H04W 84/005; H04W 28/0236

USPC .................................................. 370/235–401
See application file for complete search history.

(56) References Cited

U.S. PATENT DOCUMENTS

| 5,873,034 | A | 2/1999 | Alperovich et al. |
| 6,636,516 | B1 * | 10/2003 | Yamano .................... 370/395.52 |
| 7,778,230 | B2 * | 8/2010 | Fulknier ................. H04L 45/00 370/328 |

(Continued)

OTHER PUBLICATIONS

Aida, H. et al., "Effective Use of Heterogeneous Wireless Links in High Speed Railways by Predictive Scheduling," International Symposium on Applications and the Internet, 2008, pp. 459-462.
(Continued)

*Primary Examiner* — Afsar M Qureshi
(74) *Attorney, Agent, or Firm* — Maschoff Brennan

(57) ABSTRACT

Embodiments described herein generally relate to providing communication services to client devices in a transport system. In some examples, methods of providing communication services to client devices in a transport system are described. The methods can include exchanging, among a multiple number of routers provided in a transport system, status information of each of the multiple number of routers. The methods can also include receiving, at a given router included in the multiple number of routers, a communication addressed to a remote server accessible through a first network. The communication may be received from a client device connected to the given router through a second network different than the first network. The methods can also include, based on the status information, routing the communication to the remote server through at least the given router and the first network.

20 Claims, 9 Drawing Sheets

(51) Int. Cl.
*H04W 28/02* (2009.01)
*H04W 84/00* (2009.01)

(56) References Cited

U.S. PATENT DOCUMENTS

| | | | | |
|---|---|---|---|---|
| 8,386,593 | B1* | 2/2013 | Gao et al. | 709/223 |
| 8,457,797 | B2* | 6/2013 | Imes | F24F 11/0086 370/338 |
| 2002/0028656 | A1* | 3/2002 | Yemini et al. | 455/41 |
| 2005/0286466 | A1 | 12/2005 | Tagg et al. | |
| 2006/0203820 | A1* | 9/2006 | Coluccio | H04L 12/66 370/392 |
| 2006/0291455 | A1 | 12/2006 | Katz et al. | |
| 2008/0002576 | A1* | 1/2008 | Bugenhagen | H04L 67/1012 370/229 |
| 2008/0005293 | A1* | 1/2008 | Bhargava | H04L 45/00 709/223 |
| 2010/0255824 | A1 | 10/2010 | Shih et al. | |
| 2011/0207403 | A1 | 8/2011 | Kim et al. | |
| 2013/0091213 | A1 | 4/2013 | Diab et al. | |
| 2013/0166965 | A1* | 6/2013 | Brochu et al. | 714/48 |

OTHER PUBLICATIONS

Greve, F.D. et al., "Famous: A Network Architecture for Delivering Multimedia Services to FAst MOving USers," Department of Information Technology (INTEC), Ghent University, Belgium, Sep. 15, 2004, 24 pgs.

Luglio, M. et al., "TCP Noordwijk for High—Speed Trains," First International Conference on Advances in Satellite and Space Communications, 2009, pp. 102-106.

M. Aguado, O. Onandi, P. S. Agustin, M. Higuero, and E. J. Taquet. Wimax on rails. IEEE Vehicular Technology Magazine, 3(3):pp. 47-56, Sep. 2008.

C. D. Gavrilovich. Broadband communication on the highways of tomorrow. IEEE Communications Magazine, 39(4):pp. 146-154, Apr. 2001.

K. Ishizu, M. Kuroda, and H. Harada. Bullet train network architecture for broadband and real time access. 12th IEEE Symposium on Computers and Communications, pp. 241-248, Jul. 2007.

X. Liang, F. Ong, P. Chan, R. Sheriff, and P. Conforto. Mobile internet access for high speed trains via heterogeneous networks. The 14th IEEE International Symposium on Personal ,Indoor and Mobile Radio Communication Proceedings, 1:pp. 177-181, 2003.

BBC News. "Wi-fi may tempt train travellers" May 2004. <http://news.bbc.co.uk/2/hi/technology/3729583.stm>.

DD-WRT. "WDS Linked router network" Nov. 2011. <http://www.dd-wrt.com/wiki/index.php/WDS_Linked_router_network>.

Icomera: Connected Vehicle Solutions. Icomera AB. Feb. 17, 2012. <http://www.icomera.com>.

Railway-Technology. "Wi-Fi—Coming to a Station near You" Aug. 21, 2007. Net Resources International. Feb. 17, 2012. <http://www.railway-technology.com/features/feature1150/>.

G. Bianchi, N. Blefari Melazzi, E. Grazioni, S. Salsano, and V. San gregorio. Internet access on fast rains: 802.11 based on board wireless distribution network alternatives. 12th IST Mobile and Wireless Communications Summit, pp. 15-18, 6 2003.

R. K. K, P. Angolkar, D. Das, and R. Ramalingam. Swift: A novel architecture for seamless wireless Internet for fast trains. Vehicular Technology Conference, pp. 3011-3015, 5 2008.

B. Lannoo, D. Colle, M. Pickavet, and P. Demeester. Extension of the optical switching architecture to implement the moveable cell concept. 31st European Conference on Optical Communication, 4:807-808, Sep. 2005.

B. Lannoo, D. Colle, M. Pickavet, and P. Demeester. Radio over fiber based solution to provide broadband internet access to train passengers. Communications Magazine, 45(2):56-62, Feb. 2007.

P. Rodriguez, R. Chakravorty, J. Chesterfield, I. Pratt, and S. Banerjee. MAR: a commuter router infrastructure for the mobile Internet. MobiSys '04, pp. 217-230, 2004.

* cited by examiner

MOBILE INTERNET SERVICE SYSTEM FOR LONG DISTANCE TRAINS

CROSS-REFERENCE TO RELATED APPLICATIONS

This patent application is a continuation under 35 U.S.C. §120 of U.S. patent application Ser. No. 13/399,875, filed Feb. 17, 2012, now U.S. Pat. No. 8,737,225, issued on May 27, 2014, which is incorporated herein by reference.

BACKGROUND

Unless otherwise indicated herein, the materials described herein are not prior art to the claims in the present application and are not admitted to be prior art by inclusion in this section.

Existing infrastructures for providing Wi-Fi to Internet access to mobile devices on moving vehicles such as long distance trains (LDTs) are typically realized by relaying wireless local area network (WLAN) traffics via cellular networks, satellite, trackside WiMAX or Leaky Coaxial Cable (LCX) to the backbone network. However, there are still some barriers that hinder the use of these technologies. For example, satellite communications are not ideal for high-speed access to trains since satellite links have limited bandwidth and long round trip times (RTT). WiMAX access creates enormous financial burden for large scale installation of trackside WiMAX access points (APs) and equipment maintenance thereafter, as is the case with LCX.

Cellular-based solutions take advantage of existing cellular architecture to reduce deployment and maintenance costs. However, handoffs between base stations or other APs and drastic fading phenomena can cause severe deterioration in signal strength of a client device to an unacceptable level, resulting in degraded network performance.

SUMMARY

Some embodiments disclosed herein generally relate to providing communication services to client devices in a transport system.

In some examples, methods of providing communication services to client devices in a transport system are described. The methods can include exchanging, among a multiple number of routers provided in a transport system, status information of each of the multiple number of routers. The methods can also include receiving, at a given router included in the multiple number of routers, a communication addressed to a remote server accessible through a first network. The communication may be received from a client device connected to the given router through a second network different than the first network. The methods can also include, based on the status information, routing the communication to the remote server through at least the given router and the first network.

In some examples, a system including a multiple number of routers is described. The multiple number of routers may be configured to operate in a transport system and may be configured to provide communication services to one or more client devices present in the transport system. Each of the multiple number of routers may include a first network interface configured to communicate over a first network, a second network interface configured to communication over a second network different from the first network, a control module configured to execute computer-executable instructions, and a computer-readable storage medium having computer-executable instructions stored thereon. The computer-executable instructions may be executable by the control module to cause a respective router to perform various operations. The operations may include generating status information for the respective router. The operations may also include receiving status information at the respective router from one or more remaining routers. The operations may also include receiving a communication addressed to a remote server accessible through the first network. The communication may be received from a first client device connected to the respective router through the second network. The operations may also include, based on the received status information and status information for the respective router, routing the communication to the remote server through at least the respective router and the first network.

In some examples, a computer-readable storage medium having computer-executable instructions stored thereon is described. The computer-executable instructions may be executable by a computing device of a router to cause the router to perform various operations. The operations may include generating status information for the router. The operations may also include receiving status information from one or more other routers. The router and the one or more other routers may be configured to be operated in a transport system and may further be configured to provide communication services to one or more client devices present in the transport system. The operations may also include receiving a communication addressed to a remote server accessible through a first network. The communication may be received from a first client device connected to the router through a second network different from the first network. The operations may also include, based on the generated status information and the received status information, routing the communication to the remote server through at least the respective router and the first network.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
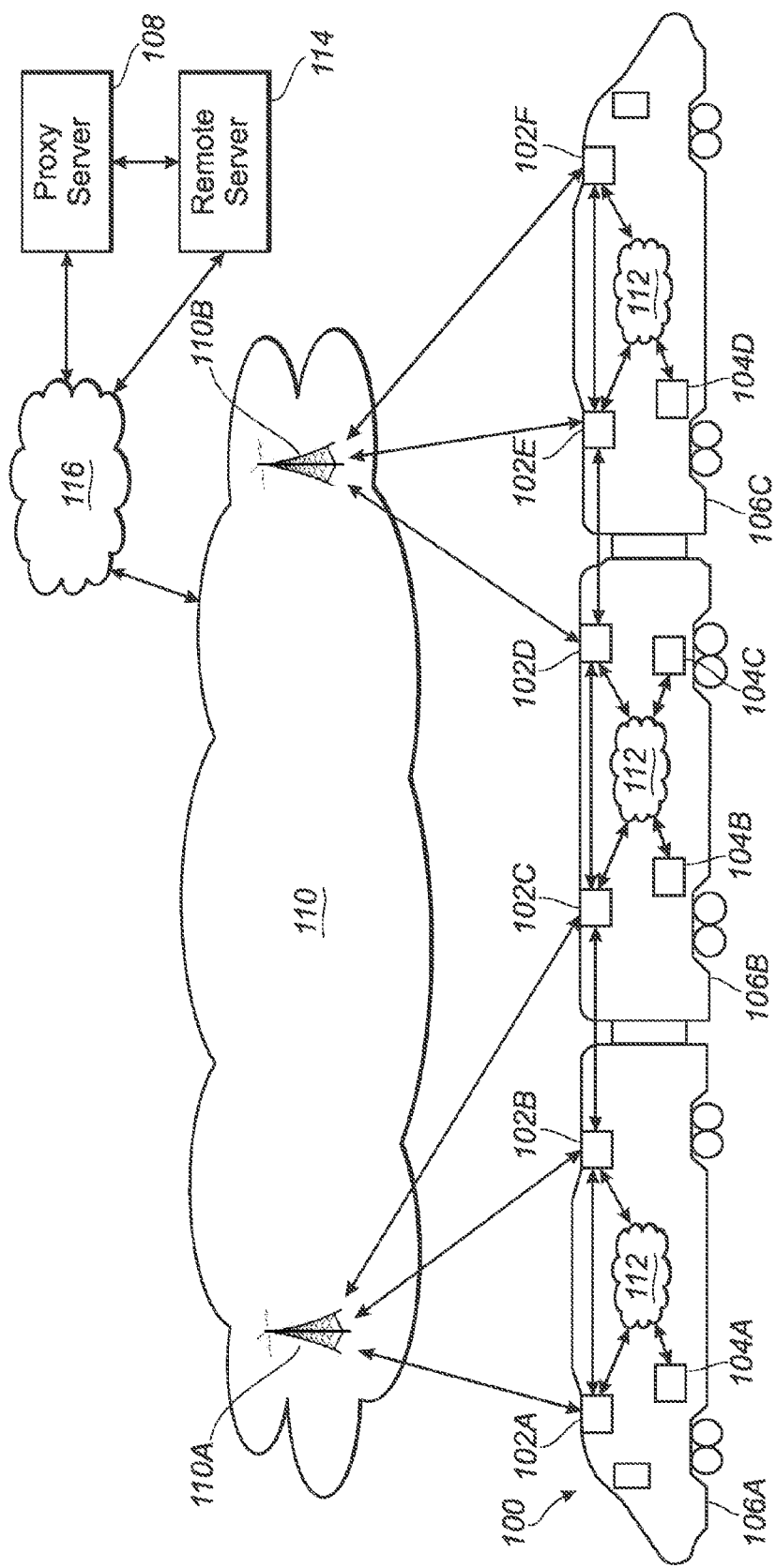
FIG. 1 is a diagram of a transport system including multiple routers configured to provide communication services to one or more client devices present in the transport system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein relate generally to providing communication services to client devices in a transport system, such as an LDT. A system for providing such communication services may include a chain of interconnected routers provided in the transport system and which bridges a LAN, such as a Wi-Fi network, to an outside WAN, such as a cellular network. The routers may implement a protocol to perform traffic rerouting, if necessary, across the routers. The protocol may exploit spatial diversity of wireless signals to reduce blackout times and otherwise improve network performance.

For example, an LDT may be around 500 meters long, with routers distributed throughout the LDT. For instance, one, two, or even more routers may be provided in each of the train cars or compartments of the LDT. In these and other embodiments, even if the LDT is partially blocked from receiving wireless signals such that some of the routers see poor or zero signal quality from the cellular network, it may be highly possible that other routers in the non-blocked portion of the LDT may see sound signal quality from the cellular network. Some embodiments disclosed herein may reroute traffic from client devices using blocked routers as access points through non-blocked routers. Thus, some of the embodiments described herein can exploit spatial diversity to amortize router failures over the whole router chain by intelligently rerouting traffic on blocked routers to non-blocked routers.

FIG. 1 is a diagram of a transport system 100 including multiple routers 102A-102F configured to provide communication services to one or more client devices 104A-104D present in the transport system 100, arranged in accordance with at least some embodiments described herein. In the illustrated embodiment, the transport system 100 may be implemented as an LDT, including a multiple number of train cars 106A-106C. More generally, the transport system 100 may include any mobile chained transport system, including, but not limited to, multi-car trains (e.g., FIG. 1), chained buses, chained trucks, and chained ships.

Collectively, the routers 102A-102F, either alone or together with an optional proxy server 108, form a communication system configured to provide communication services to the client devices 104A-104D. While the communication system including routers 102A-102F and optional proxy server 108 is illustrated as including six routers 102A-102F, in other embodiments the communication system may include as few as two routers or more than six routers up to virtually any number of routers.

In general, the routers 102A-102F may be configured to be operated in a transport system, such as the transport system 100 of FIG. 1. Additionally, the routers 102A-102F may be configured to communicate with each other. In some embodiments, for instance, the routers 102A-102F may be coupled together in a wired or wireless bus topology, or other suitable topology. For example, the routers 102A-102F may be interconnected with Wireless Distribution System (WDS).

Additionally, each of the routers 102A-102F may be configured to communicate over both a first network 110 and a second network 112 that is different than the first network 110.

The first network 110 may include a wireless wide area network (WAN), such as, but not limited to, a Universal Mobile Telecommunications System (UMTS) network, a High Speed Packet Access (HSPA) network, a Worldwide Interoperability for Microwave Access (WiMAX) network, or a 3rd Generation Partnership Project (3GPP) Long Term Evolution (LTE) network, to name a few. In these and other embodiments, the first network 110 may include one or more access points 110A, 110B which may include, for instance, base stations, enhanced Node B (eNB), or other suitable access points. The routers 102A-102F may be configured to access the access points 110A, 110B as the transport system 100 traverses over an environment that is covered, at least in part, by the first network 110.

The second network 112 may include a wired and/or wireless local area network (LAN) or personal area network (PAN) such as, but not limited to, a WiFi network, an Ethernet network, a Bluetooth network, or a ZigBee network, to name a few. In these and other embodiments, the routers 102A-102F may each include a wireless LAN (WLAN) controller forming a WLAN base station or access point configured to communicate with compatibly configured WLAN client devices 104A-104D. The WDS network through which the routers 102A-102F communicate with each other may be implemented over the second network 112.

Accordingly, in some embodiments, the routers 102A-102F may be configured to bridge the second network 112, e.g., a WiFi LAN, to the first network 110, e.g., an outside cellular wireless network. For example, the routers 102A-102F may be configured to receive and forward communications, e.g., packets, addressed to a remote server 114 accessible via the first network 110 from the client devices 104A-104D via the second network 112. In these and other embodiments, the first network 110 may interface directly with the remote server 114 or indirectly via a third network 116. The third network 116 may include the Internet, including a global internetwork formed by logical and physical connections between multiple WANs and/or LANs and can optionally include the World Wide Web, which may include a system of interlinked hypertext documents accessed via the Internet. In some embodiments, communications forwarded by the routers 102A-102F to the remote server 114 may be routed through the proxy server 108, as explained in more detail below.

Each of client devices 104A-104D may include a mobile client device or other client device configured with a suitable interface for connecting to the second network 112. In these and other embodiments, each client device 104A-104D may include, but is not limited to, a personal digital assistant (PDA), a mobile phone, a smartphone, a netbook, or a laptop computer.

The proxy server 108 may be implemented in some embodiments involving "full transparency," i.e., when all types of traffic are allowed and communications between the remote server 114 and corresponding client device 104A-104D will fail in response to path changes. In contrast, if only web traffic is allowed, the proxy server 108 may be omitted.

In more detail, in practice, Internet Protocol (IP) addresses of wide area interfaces assigned by wide area operators in some cases may be in a private range of addresses (e.g., 10.13.1.1). Communications received at a given one of routers 102A-102F from a given one of client devices 104A-104D are either tunneled by the given one of routers 102A-102F through at least the first network 110 to the remote server 114, or are forwarded to one or more additional ones of the routers 102A-102F before being tunneled through at least the first network 110 to the remote server 114.

Prior to an outgoing communication being tunneled through at least the first network 110 to the remote server 114, whether by the given one of routers 102A-102F or the last of the one or more additional ones of the routers 102A-102F, a network address translation (NAT) may be performed on the outgoing communication by the tunneling one of the routers 102A-102F. Performing a NAT on the outgoing communication in some embodiments includes translating a private source address and private source port included in the communication received from the given one of the client devices 104A-104D to obtain a public source address and public source port corresponding to the tunneling one of the routers 102A-102F. The public source address and public source port may replace the private source address and private source port in the outgoing communication tunneled through at least the first network 110 to the remote server 114. Alternately or additionally, the tunneling one of the routers 102A-102F may maintain a translation table so that return communications from the remote server 114 can be correctly routed back to the given one of the client devices 104A-104D.

Whereas communications originating from the given one of client devices 104A-104D may reach the remote server 114 through different paths due to rerouting decisions made by the routers 102A-102F, when communications including TCP packets are rerouted, TCP sessions may be torn down and reset, which may eventually result in service interruptions to the given one of client devices 104A-104D. To substantially eliminate this problem, outgoing and incoming communications may be routed through the proxy server 108. Prior to forwarding outgoing communications to the remote server 114, the proxy server 108 may re-encapsulate outgoing communications as if the outgoing communications originated from the proxy server 108. Return communications, e.g., incoming communications, from the remote server 114 may thereby be routed to the proxy server 108.

The proxy server 108 may incorporate actual destination addresses into the incoming communications and may forward them back through the first network 110 and the tunneling one of the routers 102A-102F to the given one of client devices 104A-104D. Or, if the tunneling one of the routers 102A-102F is experiencing a blackout with respect to the first network 110, the incoming communications may be forwarded through any one of the routers 102A-102F that is not experiencing a blackout with respect to the first network 110. Accordingly, the proxy server 108 may reduce the occurrence of service interruptions to client devices 104A-104D that might otherwise result from tearing down/resetting corresponding TCP sessions caused by rerouting outgoing and/or incoming TCP communications.

When an incoming communication is received at the tunneling one of the routers 102A-102F, or at a different one of the routers 102A-102F in the event the incoming communication is rerouted, the tunneling one of the routers 102A-102F may perform a deNAT on the incoming communication before forwarding the incoming communication to the given one of the client devices 104A-104D. Performing a deNAT on the incoming communication may include translating a public destination address and public destination port included in the incoming communication to obtain a private destination address and private destination port through, e.g., a lookup operation in a translation table maintained by the tunneling one of the routers 102A-102F. When the private destination address and private destination port respectively match the private source address and private source port included in the outgoing communication and corresponding to the given one of the client devices 104A-104D, the incoming communication may be forwarded by the tunneling one of the routers 102A-102F to the given one of the client devices 104A-104D.

As previously indicated, the proxy server 108 is not required in all embodiments. However, performance improvements may still be seen in embodiments lacking a proxy server 108. For instance, some embodiments described herein may include a protocol implemented by the routers 102A-102F that may reduce average temporary communication blackout time to about 1.5 seconds, compared to an average of about 6 seconds using some other protocols. Alternately or additionally, the protocol implemented by the routers 102A-102F may efficiently double average aggregate throughput compared to the average aggregate throughput using some other protocols.

In some embodiments, the protocol implemented by the routers 102A-102F may have two goals. First, the protocol may be configured to amortize both random and cascading router failure onto the whole chain of routers 102A-102F. Second, the protocol may be configured to aggregate bandwidth along the chain of routers 102A-102F. Various protocol operations according to some embodiments will now be described, followed by a description of some example rules and conditions that may govern the protocol operations.

In the discussion that follows, random router failures involve the temporary screening in an unorganized manner of one or more of the routers 102A-102F from signals transmitted to the one or more routers 102A-102F from the first network 110, or more particularly, from one or more of the access points 110A, 110B. Cascading router failures involve the temporary screening from signals transmitted from the first network 110 of multiple routers 102A-102F at a time and/or in a sequence.

A. Operations

Depending on the location of a random or cascading router failure, the chain of routers 102A-102F may be divided into two or more smaller chains. If centralized management of the routers 102A-102F were implemented, it might be difficult to accommodate such divisions while still providing substantially uninterrupted communication services to client devices 104A-104D. By implementing decentralized management of the routers 102A-102F, however, the divided two or more smaller chains of routers 102A-102F can adaptively form two or more smaller sets of interconnected routers 102A-102F to continue providing communication services to client devices 104A-104D. To support decentralized management, the routers 102A-102F and/or proxy server 108 may exchange one or more of the following control messages among each other periodically and/or in response to certain events.

A first control message may be sent by the routers 102A-102F to other routers 102A-102F and may include status information corresponding to the sending router 102A-102F. The status information included in the first control message may include, for each router i in the group of routers 102A-102F, a loading factor $W_i$ of the router i; a status of a network interface of the router i to the first network 110; an aggregated loading factor $WF_i$ of all routers 102A-102F connected, in a bus topology, forward of the router i; a number $NF_i$ of all available routers connected, in the bus topology, forward of the router i; an aggregated loading factor $WB_i$ of all routers 102A-102F connected, in the bus topology, backward of the router i; and a number $NB_i$ of all available routers connected, in the bus topology, backward of the router i.

Each router 102A-102F may broadcast or unicast a first control message periodically and/or in response to a change in the local status of the corresponding router 102A-102F. The first control message may optionally be referred to as a HELLO message. In some embodiments, the first control message may be exchanged only among the routers 102A-102F and not the proxy server 108. Alternately or additionally, first control messages may be restricted to one hop; e.g., a first control message sent by router 102B may only be transmitted to those routers within one hop of the router 102B, such as routers 102A and 102C.

A second control message may be sent by the routers 102A-102F to each other and/or the proxy server 108 to notify the proxy server 108 about the failure of a particular router's 102A-102F network interface to the first network 110. In some embodiments, for example, when a particular one of routers 102A-102F detects that its network interface to the first network 110 has failed, it may send a second control message to its immediately adjacent neighbors from among routers 102A-102F. The neighbors of the particular one of routers 102A-102F may then relay the second control message through at least the first network 110 to the proxy server 108. If the network interface to the first network 110 of the neighbor has failed, the neighbor will forward the second control message to the next neighbor, and so on until one of the routers 102A-102F is able to relay the second control message to the proxy server 108. In response to receiving a second control message, the proxy server 108 may be configured to update a local mapping table to reflect the failure of the particular one of the routers 102A-102F. The second control message may optionally be referred to as a NOTIFY message.

A third control message may be sent by any one of the routers 102A-102F to a next one of routers 102A-102F to notify the next one of the routers 102A-102F that a cascading failure has been detected. The third control message may be sent in response to detecting the cascading failure, which may be detected if, for instance, a detecting one of the routers 102A-102F receives a multiple number of second control messages from a sequence of two or more of the routers 102A-102F. The third control message may optionally be referred to as a CAscading FAilure or CAFA message.

A fourth control message may be sent periodically by a given one of the routers 102A-102F to the proxy server 108 when there is no traffic on a previously-established connection between the given one of the routers 102A-102F and the proxy server 108. The fourth control message may act as a heartbeat for the given one of the routers 102A-102F to notify the proxy server 108 that the given one of the routers 102A-102F is connected to the first network 110 and to prevent possible timeout of NAT entries, e.g., in NAT translation tables, between routers 102A-102F and the proxy server 108.

Optionally, the following operations may be performed in addition to the exchange of one or more of the first, second, third or fourth control messages to manage the routers 102A-102F and their failures.

The routers 102A-102F may be configured to listen for first control messages on one or more interconnecting interfaces with one or more adjacent neighbor routers. In response to receiving first control messages, the receiving one of the routers 102A-102F may be further configured to bind the interconnecting interfaces with the adjacent neighbor routers using unique IDs that may be included in and extracted from the received first control messages.

When a communication is received from a given one of client devices 104A-104D that initiates a new communication session (hereinafter a "session"), the receiving one of the routers 102A-102F (hereinafter the "host router") selects a route for the session, e.g., for communications associated with the session, based on the status information for the host router and the other ones of the routers 102A-102F that has been exchanged in the first control messages. The route may be a direct route through the first network 110 to the remote server 114, by the host router tunneling the session through the first network 110 and optionally the proxy server 108 to the remote server 114, or an indirect route through one or more additional ones of the routers 102A-102F by the host router forwarding the session to another one of the routers 102A-102F. If the selected route is an indirect route, the additional one of the routers 102A-102F to which the session is forwarded may similarly select either a direct or an indirect route until one of the routers 102A-102F selects a direct route and tunnels the new session through the first network 110 to the remote server. After the route is identified, and assuming all routers 102A-102F are healthy, all communications belonging to the session may follow the same route.

Each of the routers 102A-102F may be configured to monitor the status of a respective network interface to the first network 110 for failures. In some embodiments, the routers 102A-102F may each monitor both the physical status and the logical status of the respective network interface. Physical status may be set to either up or down, with the down setting indicating failure. Logical status may include one or more physical layer parameter measurements that may be collected by each router 102A-102F. The physical layer parameter measurements may include receiver signal strength indicator (RSSI), energy per chip over interference (EcIo), or the like or any combination thereof.

In response to a given one of the routers 102A-102F detecting a failure of a respective network interface to the first network 110, the given one of the routers 102A-102F may broadcast both a first and a second control message. The neighboring ones of the routers 102A-102F may then relay the second control message to the proxy server 108 for updating the reverse path. For instance, the proxy server 108 may make various updates to affected sessions in a session table maintained by the proxy server 108. Otherwise, incoming communications from the remote server 114 to the client devices 104A-104D may be dropped.

In addition, the neighboring ones of the routers 102A-102F may examine the first control message sent by the given one of the routers 102A-102F and determine whether the first control message is indicative of a random router failure or a cascading router failure. If either one of the neighboring ones of the routers 102A-102F determines that a cascading router failure is indicated, a third control message may be sent out to notify the next one of the routers 102A-102F.

In some embodiments, outgoing communications may be encapsulated at the routers 102A-102F. Accordingly, upon receiving a communication from any one of the routers 102A-102F, the proxy server 108 may be configured to decapsulate the communications. If the communication belongs to a new session, the proxy server 108 may assign a new free port to the session and then forward the communication to the destination, e.g., the remote server 114. Otherwise, the proxy server 108 may look up and forward the communication through an in-use port number. For incoming communications, the proxy server 108 may encapsulate the incoming communications and forward to the appropriate one of the routers 102A-102F.

According to some embodiments, the route of the transport system 100 may be substantially fixed or predictable, which may assist in efficiently managing the communication services provided by the routers 102A-102F. For example, where the transport system 100 is an LDT confined to a railway, the route and locations of access points 110A, 110B to the first network 110 may be known to the routers 102A-102F, and/or may be determined after one or two trips of the transport system 100 along the fixed route. Given the predictable nature of fixed routes, failure prediction can be realized in the routers 102A-102F by determining current locations of the routers 102A-102F and preparing for upcoming predictable failures such as handoffs and cell coverage blackholes in view of historical failure data.

B. Rules and Conditions for Path Selection

Having discussed various protocol operations that may be implemented, a description of some example rules and conditions will now be described according to some embodiments. Although FIG. 1 illustrates six routers 102A-102F, more generally, in any given implementation, there are n routers connected in a bus topology. To maintain a correlation between FIG. 1 and the discussion that follows, the n routers are collectively referred to hereinafter as "n routers 102."

Let a loading factor of the i-th router, hereinafter referred to as router i, be $W_i$, representing aggregated session weights for all traffic sessions in router i. A bit rate of each session may be quantized to (0,1) to become a weight, w, where 1 is referenced as the upper bound of certain network interfaces, e.g., HSPA interfaces, of the n routers 102. The weight of each session may be recalculated at the same interval as broadcasting the first control message. Suppose the weight of the i-th session is $w_i$, and there are $n_i$ ongoing sessions on router i. Thus, the loading factor $W_i$ of router i may be defined as $W_i = \Sigma_{j=1}^{n_i} w_j$. Router i may alternately or additionally keep the aggregated loading factors $WF_i = \Sigma_{j=1}^{i-1} W_j$ and $WB_i = \Sigma_{j=i+1}^{n} W_j$ in both the forward and backward directions respectively, and/or the number of available routers $NF_i = (i-1)$ and $NB_i = (n-i)$ in both the forward and backward directions respectively.

An unbalance factor $d_i$ of router i may then be expressed as $d_i = \max(WF_i/NF_i, W_i, WB_i/NB_i) - \min(WF_i/NF_i, W_i, WB_i/NB_i)$. The unbalance factor $d_i$ may be used to measure a level of load difference among the n routers 102. A larger value for the unbalance factor $d_i$ indicates a higher level of load unbalance, while a smaller value for the unbalance factor $d_i$ indicates a lower level load unbalance existing among the n routers 102.

For each new session initiated by one of client devices 104A-104D at router i, router i may have three options: forward the session to the next one of n routers 102, forward the session to the previous one of n routers 102, or send it through a network interface of the router i to the first network 110. The router i may determine whether to forward to the next or previous one of the n routers 102 or send it through the network interface based on a set of rules.

First, if the status of the network interface of the router i to the first network 110 indicates that the network interface is operational, the router i calculates a new unbalance factor $D_i$ that would result for the router i from tunneling the session to the remote server 114 through the first network 110. If the new unbalance factor $D_i$ is less than or equal to an old unbalance factor $d_i$, the router i accepts the session and tunnels all communications for the session through the first network 110.

Second, if the status of the network interface of the router i to the first network 110 indicates that the network interface is not operational, or if the new unbalance factor $D_i$ is greater than the old unbalance factor $d_i$, the router i calculates a new unbalance factor $D_i$ for two immediately adjacent routers to the router i that would result from the two immediately adjacent routers tunneling the session to the remote server 114 through the first network. The router i then forwards the session to whichever one of the immediately adjacent routers has the smallest calculated new unbalance factor $D_i$. The first and second rules may be applied by each of one or more of the n routers 102 to which the session may be forwarded until one of them tunnels the session through the first network 110 rather than forwarding the session to another router.

According to some embodiments, a traffic re-routing algorithm may also run in an infinite loop in the background to periodically check the loading of each of the n routers 102 to determine whether or not to trigger a session balancing rerouting process. For instance, if the network interface of one of the n routers 102 fails, its associated traffic may be rerouted. In some embodiments, the router i may maintain an ongoing session so long as:

Condition 1: A difference between the loading factor $W_i$ of the router i and $WF_i/NF_i$ or between the loading factor $W_i$ of the router i and $WB_i/NB_i$ is less than a threshold value. The threshold value in some embodiments may be two times a minimum ongoing session weight of the router i. If Condition 1 is not satisfied, the router i may reroute some or all of the sessions of the router i to the previous neighbor router if $WF_i/NF_i$ is less than $WB_i/NB_i$, or to the next neighbor router if $WB_i/NB_i$ is less than $WF_i/NF_i$.

Condition 2: A difference between the loading factor $W_i$ and a loading factor of the previous neighbor router is smaller than a threshold value. Even if Condition 1 is satisfied, if Condition 2 is not satisfied, the router i may reroute some or all of the sessions of the router i to the previous neighbor router.

Condition 3: A difference between the loading factor $W_i$ and a loading factor of the next neighbor router is smaller than a threshold value. Even if Conditions 1 and 2 are satisfied, if Condition 3 is not satisfied, the router i may reroute some or all of the sessions of the router i to the next neighbor router.

Table 1 includes a pseudocode representation of a re-routing algorithm that may be implemented in the n routers 102 according to some embodiments, and that may generally be consistent with the preceding description.

TABLE 1

```
Ensure: D_i ≤ d_i
Ensure: |W_{i-1} - W_i| < threshold
Ensure: |W_{i+1} - W_i| < threshold
 1: LS_{neighbors} ← LS(HELLO message)
 2: threshold ← 2 · min(w_1, w_2, . . ., w_{i,ni})
 3: if status of network interface to first network 110 is up then
 4:     if W_i - min(WF_i/NF_i, WB_i/NB_i) ≥ threshold then
 5:         if min(WF_i/NF_i, WB_i/NB_i) = WF_i/NF_i then
 6:             Shift session(s) to previous neighbor
 7:         else
 8:             Shift session(s) to next neighbor
 9:         end if
10:     else
11:         if W_i - W_{i-1} ≥ threshold then
12:             reroute some or all of router i sessions to router i-1
13:         else
14:             if W_i - W_{i+1} ≥ threshold then
15:                 reroute some or all of router i sessions to router
                    i+1
16:             end if
17:         end if
18:     end if
19: end if
```

Embodiments of the algorithm presented in Table 1 can be implemented by the n routers 102 in the absence of router failures (e.g., random and/or cascading) and/or the algorithm can be adapted to handle such router failures. For example, if a random failure occurs at the router i, suspended sessions on the router i can simply be shifted to another one of the n routers 102 according to the rules and conditions described above.

Cascading router failures can also be accommodated. The cause of cascading router failures may be from the transport system 100 traveling through a black hole in the coverage of the first network 110, such as may result from traveling through a tunnel. In these and other embodiments, if the end of the transport system 100 nearest the router 102A is the front of the transport system 100 and the transport system 100 is traveling forward, the last router 102F may remain functional for the longest amount of time after the front of the transport system 100 enters the black hole and the first router 102A may regain functionality before the other routers 102B-102F after the front of the transport system 100 exits the black hole. Thus, some embodiments described herein may include the routers 102A-102F shifting all communications towards the last router 102F when the transport system 100 begins to enter the black hole, followed by shifting all communications towards the first router 102A when the transport system 100 begins to exit the black hole.

According to some embodiments, one or more of the rules and conditions described above may substantially prevent rerouting oscillations which might otherwise be caused by quick connectivity changes to the network, including changing from being connected to disconnected and back. In particular, rerouting may only be triggered under certain conditions. Consequently, although explicit failure of the router i may trigger an immediate rerouting, resuming from disconnection will not necessarily trigger rerouting if conditions are not met.

Figure 2A:
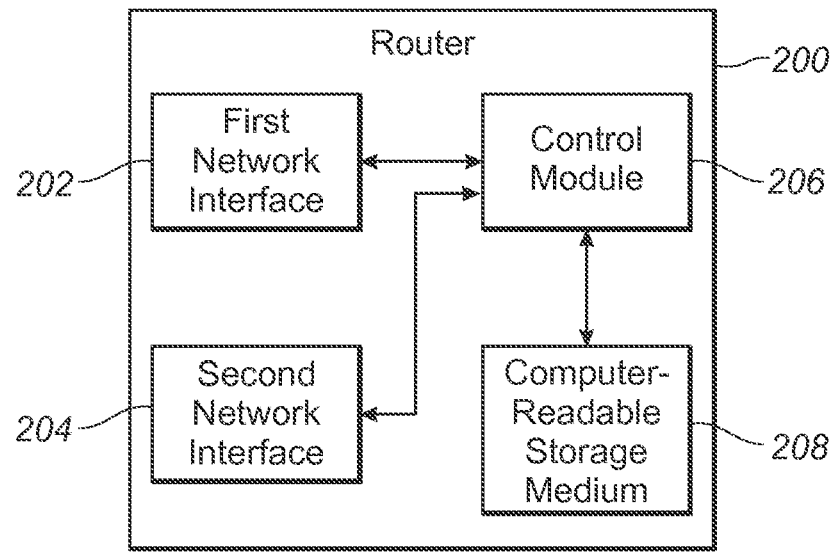
FIG. 2A is a block diagram of a router that may be included in the transport system of FIG. 1.

FIG. 2A is a block diagram of a router 200 that may be included in the transport system 100 of FIG. 1, arranged in accordance with at least some embodiments described herein. For instance, the router 200 of FIG. 2A may correspond to any one of the routers 102A-102F of FIG. 1.

The router 200 may include at least first and second network interfaces 202, 204, a control module 206 and a computer-readable storage medium 208. In general, the first network interface 202 may be configured to communicate over a first network including a WAN, such as the first network 110 of FIG. 1, while the second network interface 204 may be configured to communicate over a second network including a LAN or a PAN, such as the second network 112 of FIG. 1.

Although the router 200 of FIG. 2A is depicted with only two network interfaces 202, 204, in other embodiments, the router 200 may include three or more network interfaces. For instance, the router 200 may include two or more network interfaces for communicating over different WANs, and/or two or more network interfaces for communicating over different LANs and/or PANs.

Each of the first and second network interfaces 202, 204 may include an antenna configured to receive analog electromagnetic wave signals in a particular frequency range and a receiver configured to convert the received analog electromagnetic wave signals into digital signals formatted for delivery to the control module 206. Each of the first and second network interfaces 202, 204 may also include a signal amplifier incorporated in the antenna, incorporated in the router 200, or installed between the antenna and the control module 206.

Each of the first and second network interfaces 202, 204 may also include a signal transmitter configured to transmit analog electromagnetic wave signals in a particular frequency range and with a desired signal power amplitude through the antenna of the first or second network interface 202, 204. Each signal transmitter may be configured to receive digital signals from the control module 206 and to convert the control signals into analog electromagnetic wave signals in a particular frequency range and formatted for radio transmission to another signal receiver.

The control module 206 may be configured to send digital signals to and receive digital signals from each of the first and second network interfaces 202, 204. The digital signals may represent outgoing communications received from a client device, such as the client devices 104A-104D of FIG. 1, and/or incoming communications received from a remote server or proxy server, such as the remote server 114 or proxy server 108 of FIG. 1. Alternately or additionally, the digital signals may represent communications exchanged with another router, such as communications exchanged between the routers 102A-102F of FIG. 1. Moreover, the control module 206 may be configured to execute computer-executable instructions stored on the computer-readable storage medium 208 to cause the router 200 to perform one or more of the operations described herein with respect to, e.g., the routers 102A-102F.

The computer-readable storage medium 208 may store computer-executable instructions, such as program code, as well as data and/or other information used by the control module 206 or other components of the router 200. The computer-executable instructions stored on the computer-readable storage medium may be executable by the control module 206 to cause the router 200 to perform one or more of the operations described herein. The computer-readable storage medium 208 may include, but is not limited to RAM, ROM, EEPROM, CD-ROM or other optical disk storage, magnetic disk storage or other magnetic storage devices, solid state storage, or any other non-transitory medium which can be used to carry or stored desired program code means in the form of computer-executable instructions or data structures and which can be accessed by the control module 206.

Figure 2B:
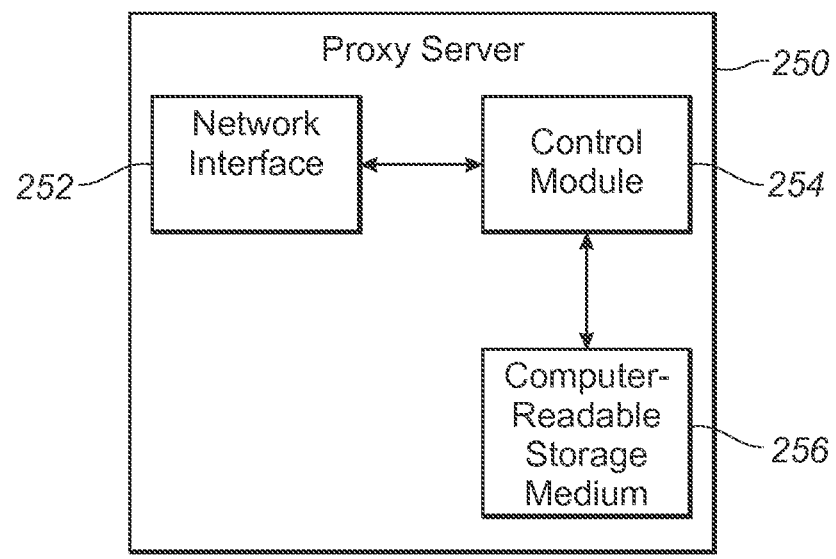
FIG. 2B is a block diagram of a proxy server that may be included in a communication system together with the routers of FIG. 1.

FIG. 2B is a block diagram of a proxy server 250 that may be included in a communication system together with the routers 102A-102F of FIG. 1, arranged in accordance with at least some embodiments described herein. In some embodiments, the proxy server 250 of FIG. 2B may correspond to the proxy server 108 of FIG. 1.

The proxy server 250 may include a network interface 252, a control module 254 and a computer-readable storage medium 256. In general, the network interface 252 may be configured to communicate over a third network, such as the third network 116 of FIG. 1, via a wired or wireless connection.

The control module 254 may be configured to send digital signals to and receive digital signals from the third network interface 252. The digital signals may represent outgoing or incoming communications routed from or to one or more routers, such as the routers 102A-102F of FIG. 1. Moreover, the control module 254 may be configured to execute computer-executable instructions stored on the computer-readable storage medium 256 to cause the proxy server 250 to perform one or more of the operations described herein with respect to, e.g., the proxy server 108.

The computer-readable storage medium 256 may store computer-executable instructions, such as program code, as well as data and/or other information used by the control module 254 or other components of the proxy server 250. The computer-executable instructions stored on the computer-readable storage medium may be executable by the control module 254 to cause the proxy server 250 to perform one or more of the operations described herein. The computer-readable storage medium 256 may include, but is not limited to RAM, ROM, EEPROM, CD-ROM or other optical disk storage, magnetic disk storage or other magnetic storage devices, solid state storage, or any other non-transitory medium which can be used to carry or stored desired program code means in the form of computer-executable instructions or data structures and which can be accessed by the control module 254.

Figure 3:
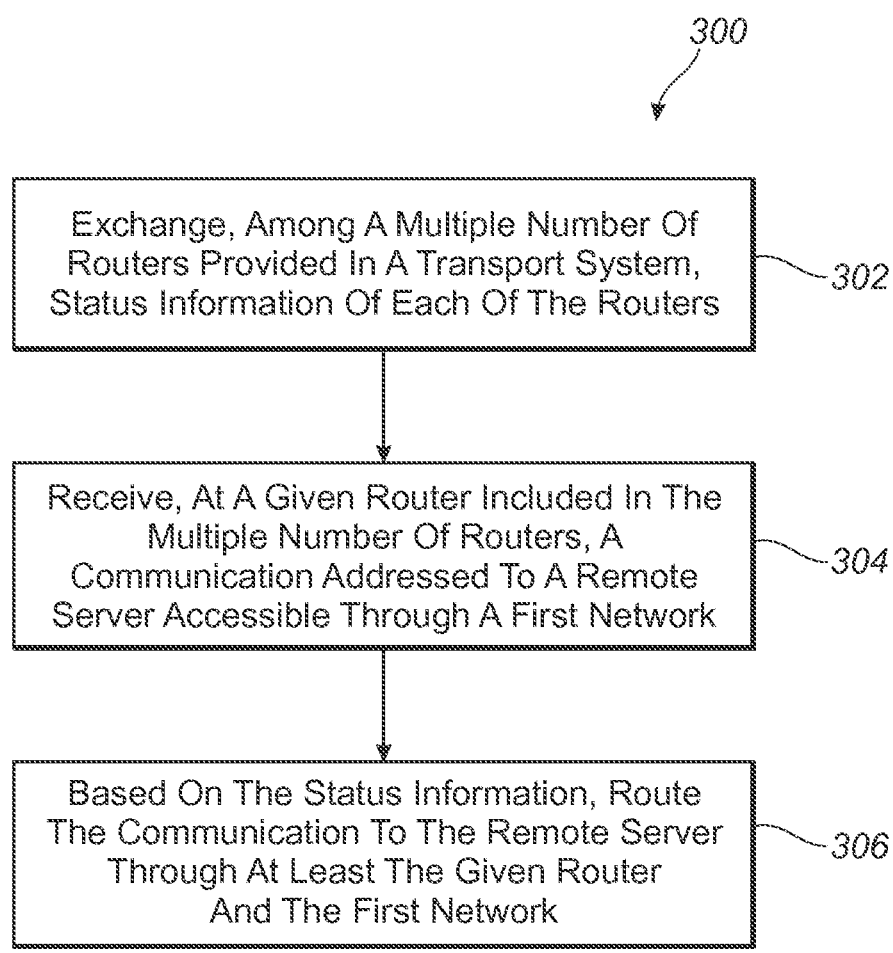
FIG. 3 shows an example flow diagram of a method for providing communication services to client devices in a transport system.

FIG. 3 shows an example flow diagram of a method 300 for providing communication services to client devices in a transport system, arranged in accordance with at least some embodiments described herein. The method 300 may be performed in some embodiments by one or more of the routers 102A-102F in the transport system 100 of FIG. 1, and/or by the proxy server 108. The method 300 includes various operations, functions or actions as illustrated by one or more of blocks 302, 304 and 306. The method may begin at block 302.

In block 302, status information of each of a multiple number of routers provided in a transport system may be exchanged among the routers. For example, the status information may be exchanged among the routers 102A-102F of FIG. 1 in one or more first control messages. Alternately or additionally, the exchange of status information may occur according to a predefined periodic schedule, or in response to detecting a change in a connection status of a particular one of the routers to the first network. In some embodiments, exchanging status information includes, for a given one of the routers 102A-102F, sending status information for the given one of the routers 102A-102F to one or more neighboring routers, and receiving status information for the one or more neighboring routers from the one or more neighboring routers. The one or more neighboring routers may be connected immediately adjacent to the given one of the routers 102A-102F in the bus topology. Block 302 may be followed by block 304.

In block 304, a communication addressed to a remote server accessible through a first network may be received at a given router included in the multiple number of routers. Alternately or additionally, the communication may be received from a client device connected to the given router through a second network different than the first network. For example, an outgoing communication addressed to the remote server 114 of FIG. 1 can be received at a given one of the routers 102A-102F from one of the client devices 104A-104D via the second network 112. Block 304 may be followed by block 306.

In block 306, based on the status information, the communication may be routed to the remote server through at least the given router and the first network. For example, an outgoing communication received at a given one of the routers 102A-102F of FIG. 1 may be routed through at least the given one of the routers 102A-102F and the first network 110 to the remote server 114 based on status information exchanged among the routers 102A-102F. In some embodiments, routing the communication to the remote server through at least the given router and the first network may include the given router tunneling the communication to the remote server through the first network. Alternately or additionally, routing the communication to the remote server through at least the given router and the first network may include the given router forwarding the communication to a neighbor router included in the multiple number of routers, where the communication is tunneled to the remote server through the first network by the neighbor router or another router included in the multiple number of routers.

In some embodiments, communications are encapsulated for tunneling, which may include adding an extra TCP header to each communication. In these and other embodiments, the overall length of the communication may exceed a Maximum Transmission Unit (MTU), which may be about 1,500 bytes. Exceeding the MTU may lead to the communication being discarded by traditional network elements. Accordingly, some embodiments set a maximum segment size (MSS) per communication to the length of MTU minus an additional header, or to 1,420 bytes in some embodiments. Consequently, even though encapsulated communications may include an additional TCP header of 40 bytes and optionally a 12-byte proprietary header, the encapsulated communications may still be less than or equal to 1,500 bytes. Alternately or additionally, some of the communications carried over the routers may be implemented as L2 packets, as opposed to IP packets.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, although not shown in FIG. 3, the method 300 may further include generating, at each respective router, status information for the respective router.

Alternately or additionally, the method 300 may further include routing the communication to the remote server through a proxy server. In these and other embodiments, the method 300 may further include, at the proxy server, receiving the communication routed through at least the given router and the first network, re-encapsulating the communication as if the communication originated from the proxy server, and forwarding the re-encapsulated communication to the remote server. Alternately or additionally, the method 300 may further include, at the proxy server, receiving a return or incoming communication from the remote server in response to the re-encapsulated communication, addressing the return communication to the client device, and forwarding the re-addressed return communication through the first network to the client device.

In some embodiments, the method 300 may further include performing a NAT on a private source address and private source port included in the communication from the client device to obtain a public source address and public source port corresponding to one of the routers. The public source address and public source port may be included in the communication routed to the remote server. Alternately or additionally, the method 300 may further include receiving a return or incoming communication from the remote server, performing a deNAT on a public destination address and public destination port included in the return communication to obtain a private destination address and private destination port, and when the private destination address and private destination port respectively match the private source address and private source port included in the communication from the client device, forwarding the return communication to the client device.

In some embodiments, the status information may include, for each router i in the multiple number of routers, $W_i$; a status of a network interface of the router i to the first network; $WF_i$; $NF_i$; $WB_i$; and $NB_i$ as already set forth above. Alternately or additionally, in some embodiments, each time status information is exchanged, each of the routers may be configured to calculate a corresponding unbalance factor $d_i$ based on the status information. In these and other embodiments, the method 300 may further include evaluating one or more of the rules and conditions described above and, depending on the outcome of the evaluation, performing one or more of the operations described above.

Some embodiments disclosed herein include a computer-readable storage medium having computer-executable instructions stored thereon that are executable by a computing device to perform operations included in the method 300 of FIG. 3, such as the operations illustrated by blocks 302, 304, and/or 306 in FIG. 3, and/or variations thereof. In these and other embodiments, such a computing device may be included in each of the routers and/or in the proxy server. For instance, the computing device may include the control module 206 included in the router 200 of FIG. 2A and/or the control module 254 included in the proxy server 250 of FIG. 2B. Alternately or additionally, the computer-readable storage medium may include the computer-readable storage medium 208 and/or 256 of FIGS. 2A and/or 2B.

Figure 4:
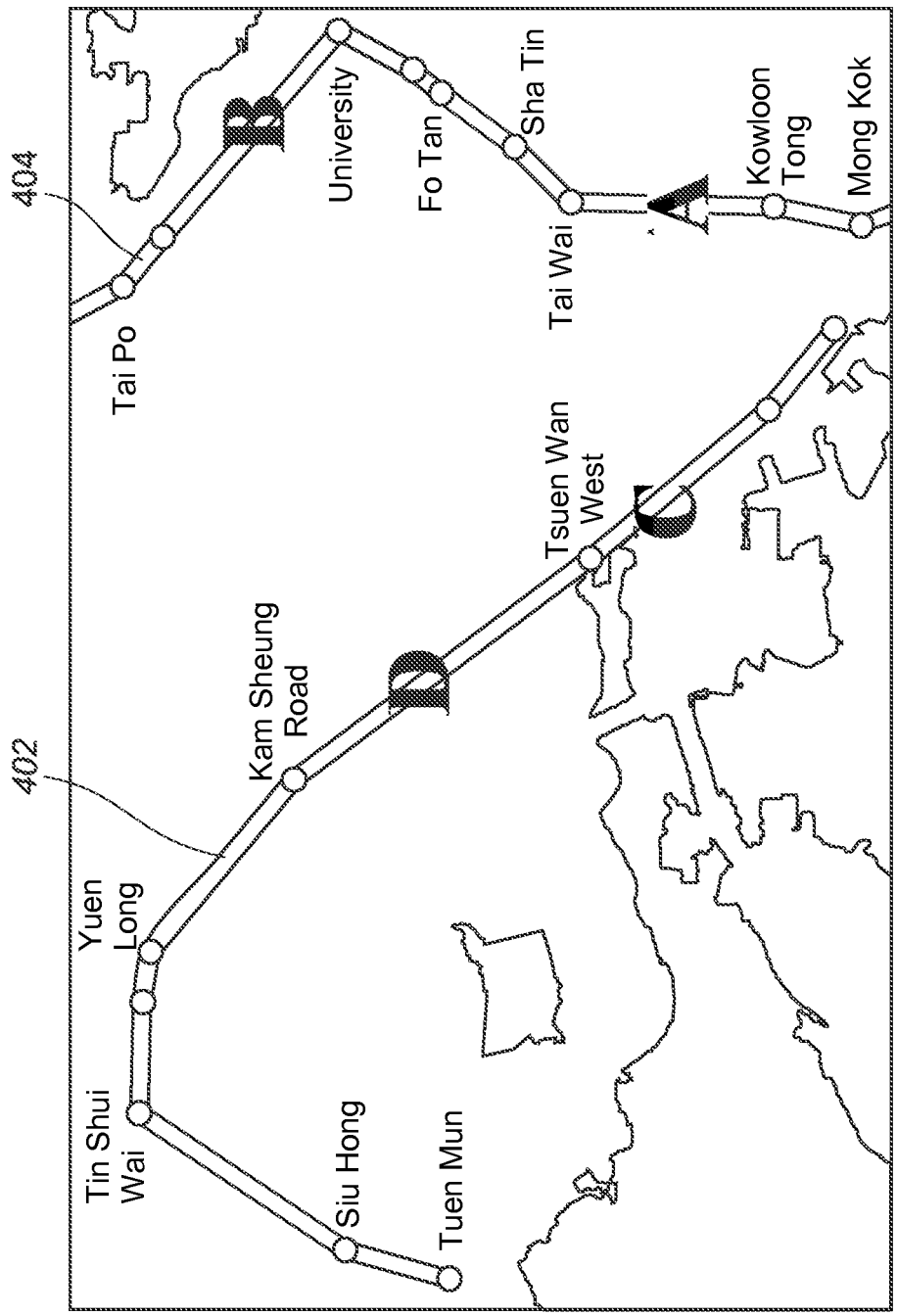
FIG. 4 is a map depicting two long distance train routes in which an example configuration including four routers was implemented.

With respect to FIGS. 4-9, an example test case and experimental results will be described. FIG. 4 is a map depicting two LDT routes 402, 404 in which an example embodiment including four routers R1, R2, R3 and R4 was implemented, arranged in accordance with at least some embodiments described herein. In particular, the four routers R1-R4 were provided in the first four compartments, stretching about 100 meters in length, of an LDT that could travel on LDT routes 402 and 404. Each router R1-R4 was positioned at about the middle of the respective compartment. The routers R1-R4 were interconnected via WDS and each included an HSPA network interface configured for communicating with a cellular network corresponding to the first network 110 of FIG. 1, as well as a WiFi network interface configured for communication with a WiFi network corresponding to the second network 112 of FIG. 1. Locations denoted by A, B, C and D in FIG. 4 are cellular coverage black-holes where cascading failures are observed.

Two substantially identical proxy servers were also provided for the tests and were separately hosted in a lab and a commercial data center to ensure that results would not be affected by anything specific to one proxy server and its path. Various netbooks running Ubuntu 9.04 and Windows XP were provided as the client devices for the tests to ensure OS dependent issues were dispelled. At least one client device was associated with each of the four routers R1-R4.

During a first test phase, an embodiment of the example protocols described herein was enabled in each of the four routers R1-R4. During a second test phase, the embodiment of the example protocols described herein was disabled. The configuration of the four routers R1-R4 with the embodiment of the example protocols enabled will be referred to hereinafter as the "protocol-enabled configuration of FIG. 4," and the configuration of the four routers R1-R4 with the embodiment of the example protocols disabled will be referred to hereinafter as the "protocol-disabled configuration of FIG. 4." Performance results were obtained during both the first and second test phases for both the protocol-enabled and protocol-disabled configurations. Some of the performance results are provided below.

The tests were done by sending bursts of data packets back-to-back from client device to remote server via HSPA links and measured throughput based on the inter-arrival times between packets in a burst. To measure blackout periods, traces were collected of packets in railway environments during a period of 3,600 seconds for each router R1, R2, R3, or R4 and for all of the routers R1-R4 collectively. For each trace, periods of time were identified where the inter-arrival time between packets was greater than a given blackout threshold. Snapshots for random and cascading router failure caused blackout for routers R1-R4 in both the protocol-enabled and protocol-disabled configurations of FIG. 4 are provided in FIGS. 5A-5D.

Figure 5A:
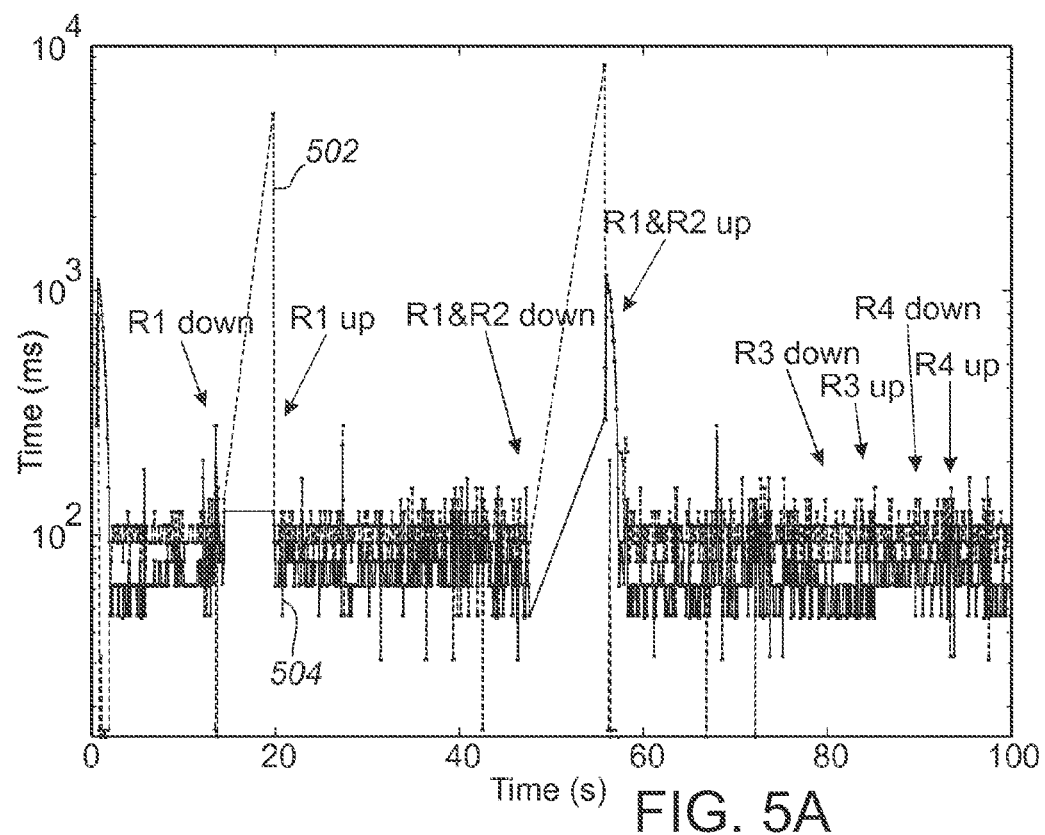
FIG. 5A is a line graph depicting random failure blackout time and associated RTT in a protocol-disabled configuration of FIG. 4.
Figure 5B:
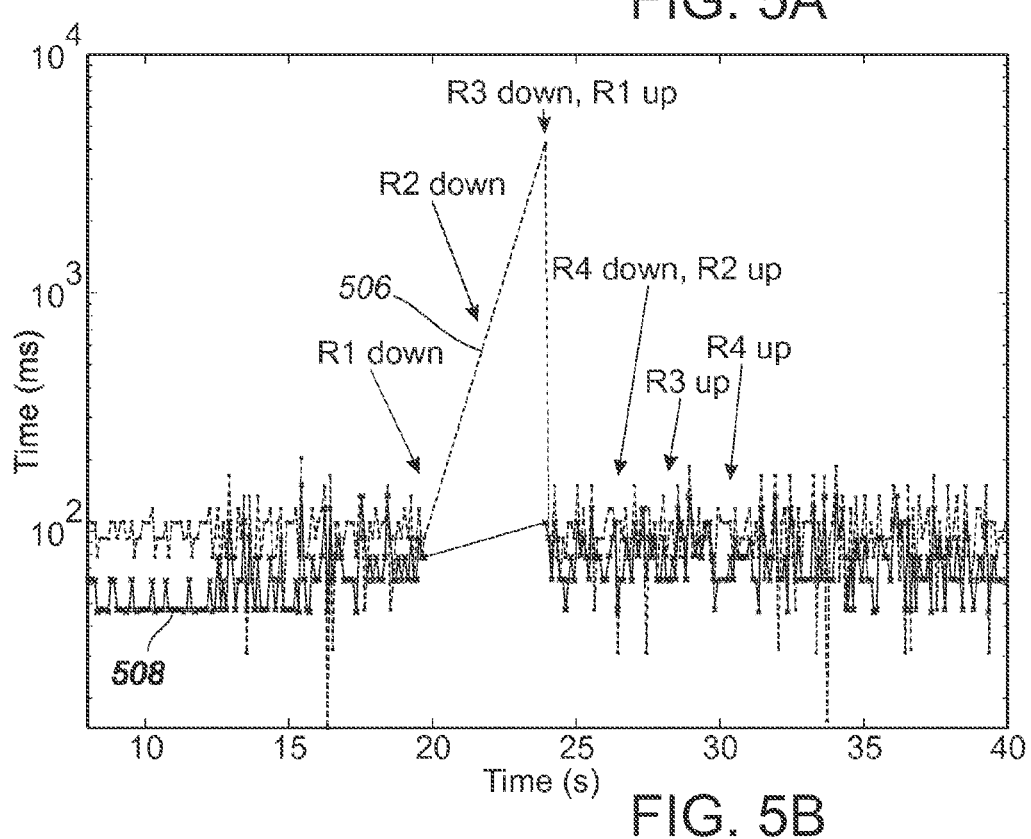
FIG. 5B is a line graph depicting cascading failure blackout time and associated RTT in the protocol-disabled configuration of FIG. 4.
Figure 5C:
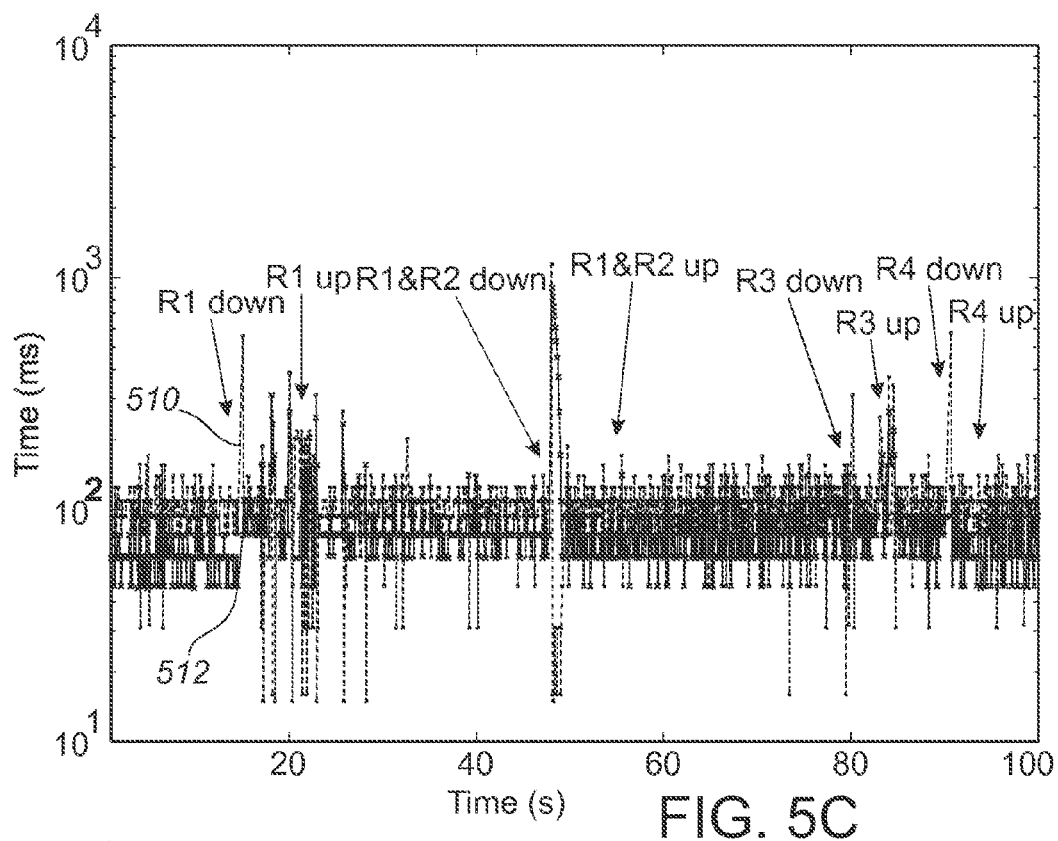
FIG. 5C is a line graph depicting random failure blackout time and associated RTT in the protocol-enabled configuration of FIG. 4.
Figure 5D:
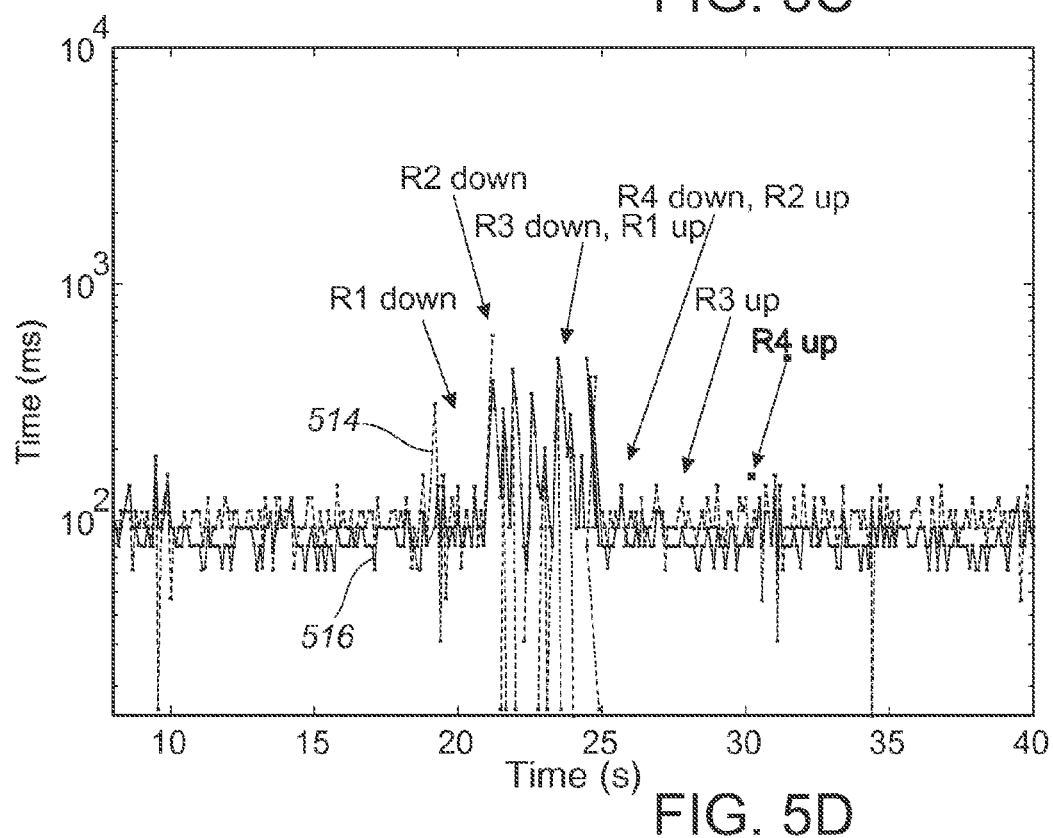
FIG. 5D is a line graph depicting cascading failure blackout time and associated RTT in the protocol-enabled configuration of FIG. 4.

FIG. 5A is a line graph depicting random failure blackout time 502 and associated RTT 504 in the protocol-disabled configuration of FIG. 4, arranged in accordance with at least some embodiments described herein. FIG. 5B is a line graph depicting cascading failure blackout time 506 and associated RTT 508 in the protocol-disabled configuration of FIG. 4, arranged in accordance with at least some embodiments described herein. FIG. 5C is a line graph depicting random failure blackout time 510 and associated RTT 512 in the protocol-enabled configuration of FIG. 4, arranged in accordance with at least some embodiments described herein. FIG. 5D is a line graph depicting cascading failure blackout time 514 and associated RTT 516 in the protocol-enabled configuration of FIG. 4, arranged in accordance with at least some embodiments described herein. FIGS. 5A-5D additionally include markers identifying the beginning and ending of failures for a given router, e.g., R1 up, R1 down, etc. It can be seen from a comparison of FIGS. 5A and 5B to FIGS. 5C and 5D, respectively, that the protocol-enabled configuration of FIG. 4 gives flatter and narrower curves in FIGS. 5C and 5D than in the protocol-disabled configuration of FIG. 4 in FIGS. 5A and 5B.

Figure 6A:
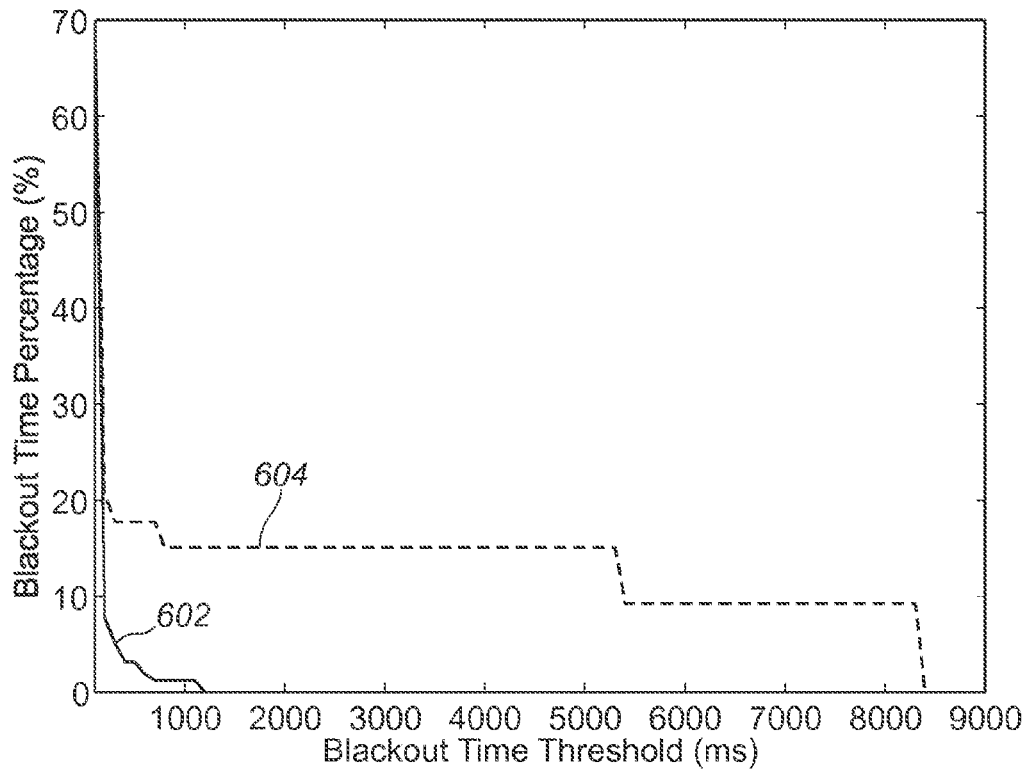
FIG. 6A is a line graph depicting a distribution of random failure blackout time in both the protocol-enabled and protocol-disabled configurations of FIG. 4.

FIG. 6A is a line graph depicting a distribution of random failure blackout time in both the protocol-enabled and protocol-disabled configurations of FIG. 4, arranged in accordance with at least some embodiments described herein. In particular, curve 602 represents the distribution of random failure blackout time in the protocol-enabled configuration of FIG. 4, and curve 604 represents the distribution of random failure blackout time in the protocol-disabled configuration of FIG. 4.

Figure 6B:
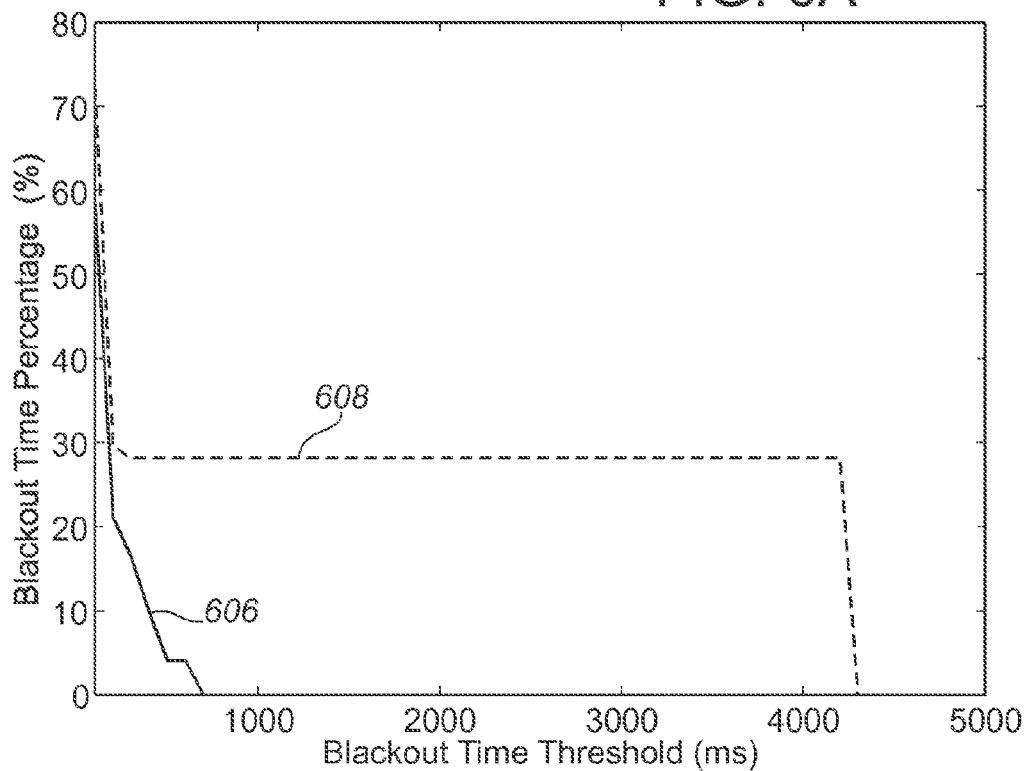
FIG. 6B is a line graph depicting a distribution of cascading failure blackout time in both the protocol-enabled and protocol-disabled configurations of FIG. 4.

FIG. 6B is a line graph depicting a distribution of cascading failure blackout time in both the protocol-enabled and protocol-disabled configurations of FIG. 4, arranged in accordance with at least some embodiments described herein. In particular, curve 606 represents the distribution of cascading failure blackout time in the protocol-enabled configuration of FIG. 4, and curve 608 represents the distribution of cascading failure blackout time in the protocol-disabled configuration of FIG. 4.

From FIGS. 6A and 6B, it can be seen that the amount of time spent in a blackout can be significant for a given one of the routers R1-R4. This may be a natural effect of circumstances in some mobile environments, e.g., mobile devices may suffer frequent cell handoffs, loss of coverage, and sudden disconnections. By comparing the curves 602, 606 representing random and cascading failure blackout time in the protocol-enabled configuration of FIG. 4 to the curves 604, 608 representing random and cascading failure blackout time in the protocol-disabled configuration of FIG. 4, it can be seen that routers R1-R4 in the protocol-enabled configuration of FIG. 4 collectively spend significantly less time in a blackout than routers in the protocol-disabled configuration of FIG. 4. Thus, the probability that a mobile device connected to any one of the routers R1-R4 cannot receive data from any of the routers R1-R4 for a period of 10 seconds or more is almost negligible. Therefore, the protocol-enabled configuration of FIG. 4 may significantly increase resilience against network failures due to the dynamic rerouting strategy described herein according to some embodiments.

Figure 7A:
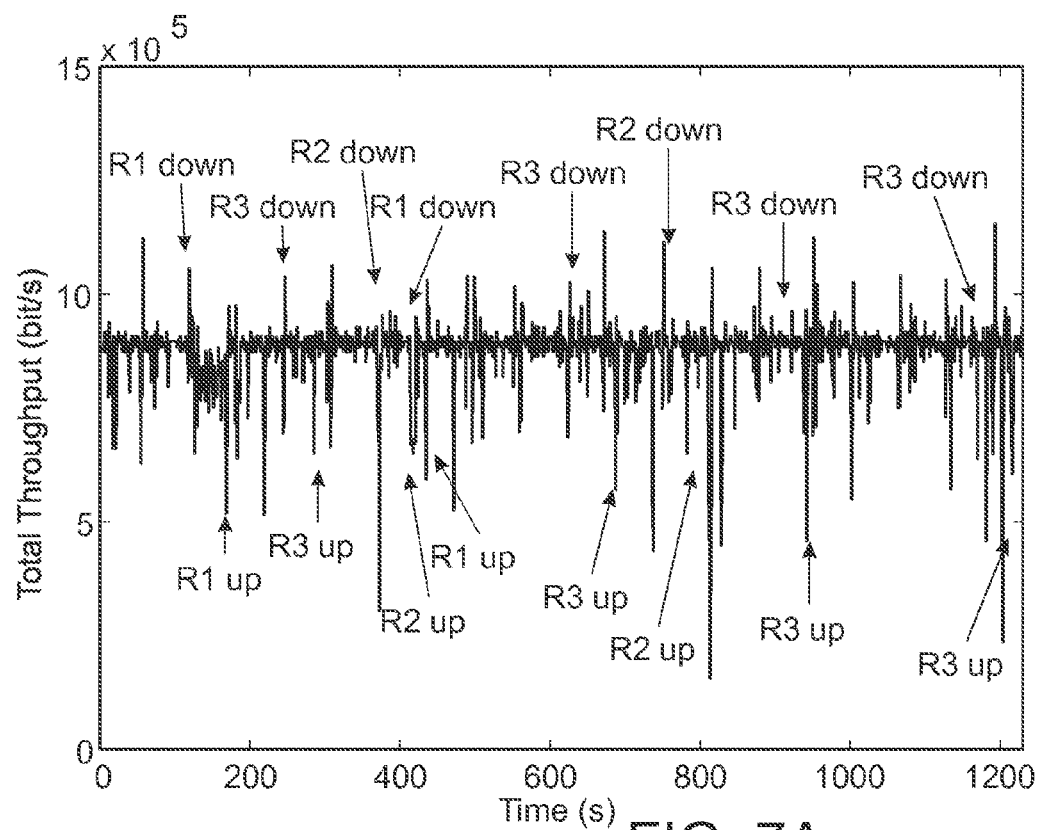
FIG. 7A is a line graph depicting aggregated throughput with random failure in the protocol-enabled configuration of FIG. 4.
Figure 7B:
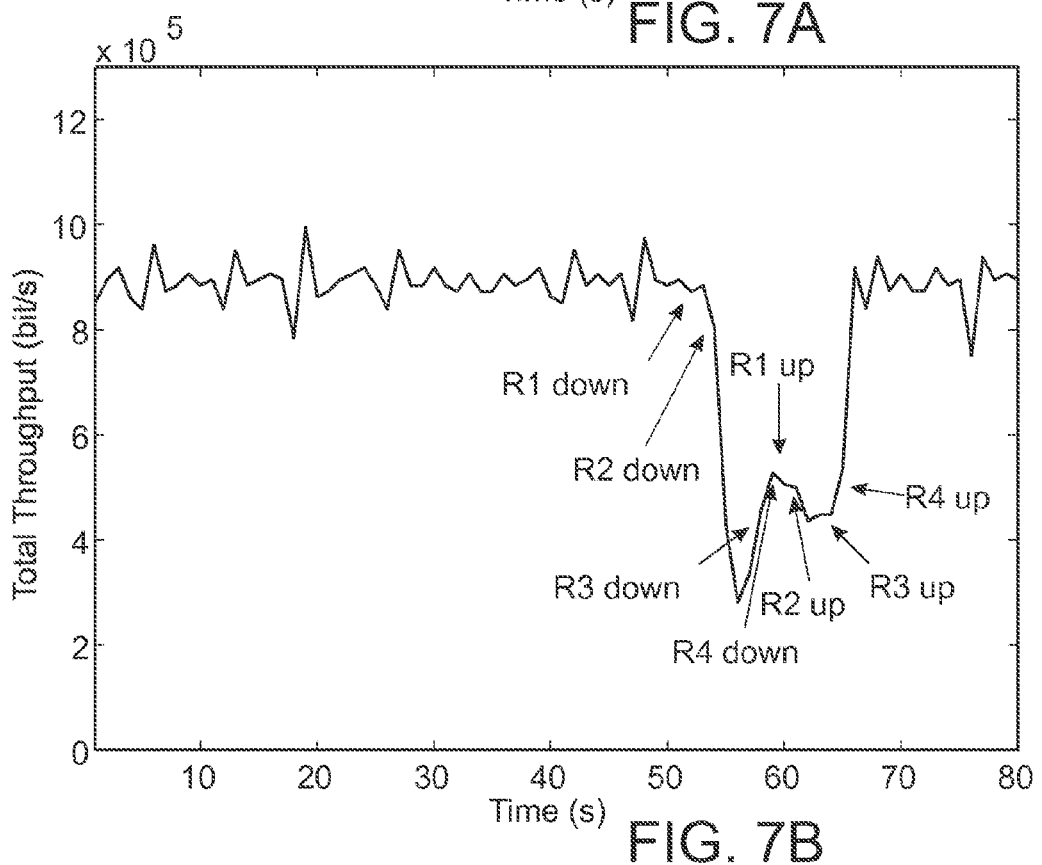
FIG. 7B is a line graph depicting aggregated throughput with cascading failure in the protocol-enabled configuration of FIG. 4.

FIG. 7A is a line graph depicting aggregated throughput with random failure in the protocol-enabled configuration of FIG. 4, arranged in accordance with at least some embodiments described herein. FIG. 7B is a line graph depicting aggregated throughput with cascading failure in the protocol-enabled configuration of FIG. 4, arranged in accordance with at least some embodiments described herein. Conventionally, for UDP traffics, all packets flowing through failed routers are lost but the session remains. Additionally, TCP resets its connection if the blackout time is larger than predetermined timeout threshold. Both are unwanted side effects for communications. In FIG. 7A, the HSPA interfaces of the four routers R1-R4 failed randomly over time, with each router involved in a failure seeing no throughput until its connection is restored. In FIG. 7B, the HSPA interfaces of the four routers R1-R4 failed in a sequential "cascading" manner over time, with each router involved in a failure seeing no throughput until is connection is restored.

Figure 8:
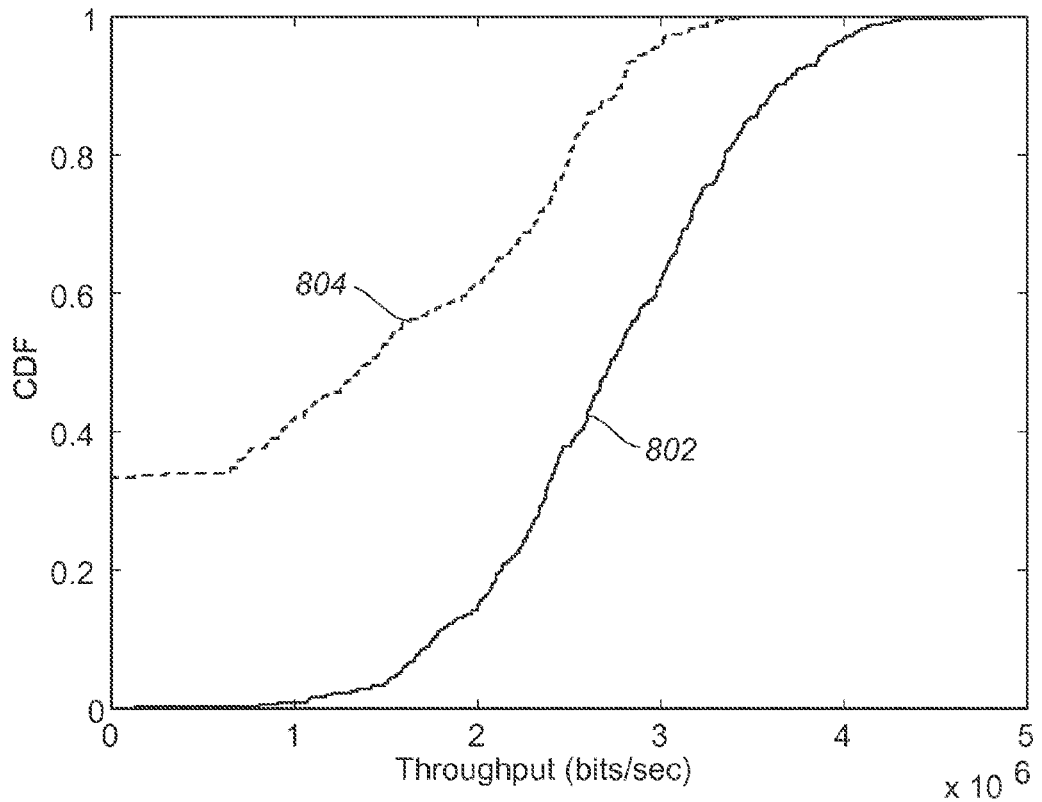
FIG. 8 is a line graph depicting CDF of throughput in both the protocol-enabled and protocol-disabled configurations of FIG. 4.

FIG. 8 is a line graph depicting CDF of throughput in both the protocol-enabled and protocol-disabled configurations of FIG. 4, arranged in accordance with at least some embodiments described herein. In particular, curve 802 represents CDF of throughput in the protocol-enabled configuration of FIG. 4, and curve 804 represents CDF of throughput in the protocol-disabled configuration of FIG. 4. FIG. 8 shows that overall throughput of the protocol-enabled configuration of FIG. 4 is always higher than the protocol-disabled configuration of FIG. 4. The protocol-enabled configuration of FIG. 4 explicitly appears to have a factor of two times higher throughput than the protocol-disabled configuration of FIG. 4.

It may be possible to realize an even greater improvement if more than four routers R1-R4 are implemented. In some embodiments, the percentage of improvement may vary with respect to probability of actual link failure and connection blackout. In mobile scenarios, as measured in the LDT routes 402, 404 of FIG. 4, the HSPA interface of each of routers R1-R4 experienced about 10% connection blackout time in a total journey of about 50 minutes. Some embodiments of the protocols described herein take advantage of channel diversity to relay traffic for broken links. Therefore, it is estimated that with more connection blackouts, greater improvements may be realized by embodiments of the protocols described herein.

Figure 9:
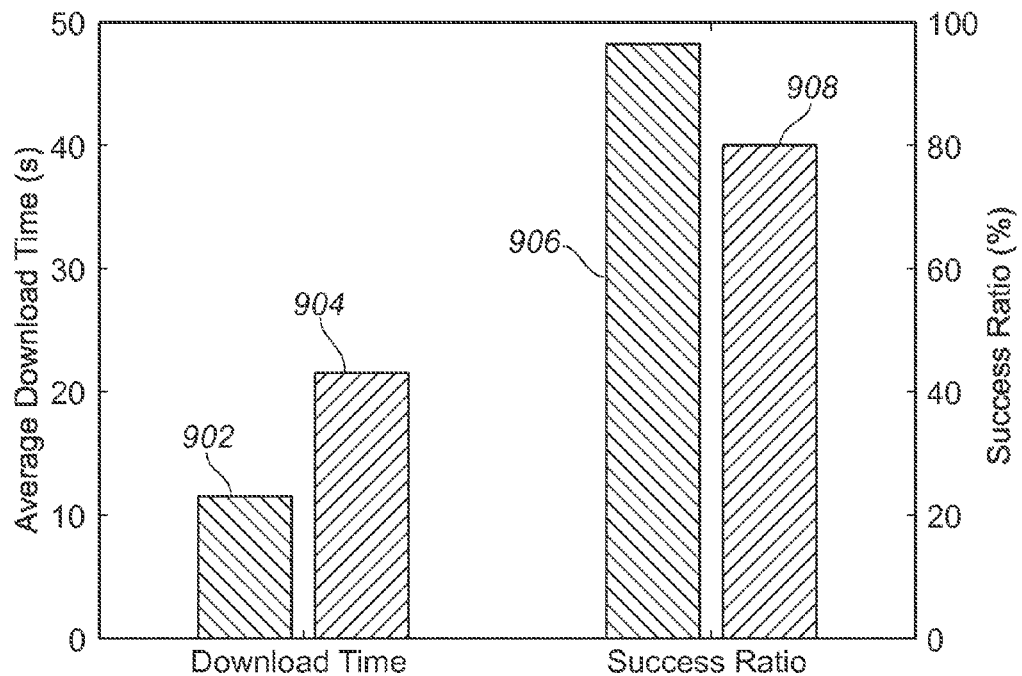
FIG. 9 is a bar graph depicting average download time and download success ratio for a client device in both the protocol-enabled and protocol-disabled configurations of FIG. 4, all arranged according to at least some embodiments described herein.

FIG. 9 is a bar graph depicting average download time and download success ratio for a client device in both the protocol-enabled and protocol-disabled configurations of FIG. 4, arranged in accordance with at least some embodiments described herein. Whereas web-browsing may be one of the most common Internet services, web-browsing traffic has been adopted herein to measure application performance between both the protocol-enabled and protocol-disabled configurations of FIG. 4.

The web-browsing tests were implemented by first downloading a copy of a front page of a particular website to a test server. This was done to avoid any official updates to the website to keep the test fair and consistent. The downloaded front page consisted of 89 objects with an aggregate size of 1145 Kbytes. With an average bit rate of 400 Kbps each, a Firefox web browser can often fully download such a page within 20 seconds using HSPA access. Accordingly, a Firefox web browser plugin application was implemented to randomly refresh so as to force repeated download of the front page of the website for these tests. The randomness was chosen between 30 to 60 seconds to ensure a reasonably long time interval for concurrent access as well as individual access among client devices during the tests. Caching was disabled to force the web browser to download from the server each time a "refresh" command was triggered. Applicants believe the tests reflect actual behaviors of passengers inside a compartment of a commuter train, where they access the Internet in a substantially random manner.

FIG. 9 illustrates that the average download time 902 in the protocol-enabled configuration of FIG. 4 was about half as long as the average download time 904 in the protocol-disabled configuration of FIG. 4. FIG. 9 also illustrates that the success ratio 906 in the protocol-enabled configuration of FIG. 4 was significantly better than the success ratio 908 in the protocol-disabled configuration of FIG. 4. From FIG. 9 it can be seen that on average, client device users may perceive nearly no disconnection even though their associated router R1-R4 may have lost a connection with the HSPA network or other corresponding wide area network.

Those skilled in the art will appreciate, with the benefit of the present disclosure, that embodiments disclosed herein can be implemented in connection with off-the-shelf client devices that do not have to be modified to when implementing the embodiments disclosed herein. Thus, implementation of some of the embodiments described herein does not require the widespread adoption, by users, of new client devices. Alternately or additionally, the embodiments described herein may substantially reduce blackout times caused by temporary network failures to the point that users may not even be aware of or experience service interruptions caused by temporary network blackouts. Alternately or additionally, embodiments of the protocols and/or algorithms disclosed herein may be feasibly implemented into standard WiFi access points.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of providing communication services to client devices in a transport system, the method comprising:
   receiving, at a given router among a plurality of routers provided in the transport system, status information of one or more of the plurality of routers; and
   based on the status information, the given router routing communications between a remote server accessible through a first network and a client device connected to the given router through a second network different than the first network.

2. The method of claim 1, wherein the given router routing communications between the remote server accessible through the first network and the client device connected to the given router through the second network includes:
   the given router tunneling a first communication to the remote server through the first network; and
   the given router forwarding a second communication to a neighbor router included in the plurality of routers, wherein the second communication is tunneled to the remote server through the first network by the neighbor router or another router included in the plurality of routers.

3. The method of claim 1, further comprising the given router routing communications to the remote server through a proxy server.

4. The method of claim 1, further comprising the given router performing a network address translation (NAT) on a private source address and private source port included in a communication from the client device to the remote server to obtain a public source address and public source port corresponding to the given router, wherein the public source address and public source port are included in the communication routed to the remote server.

5. The method of claim 4, further comprising:
   the given router maintaining a translation table;
   the given router receiving a return communication from the remote server;
   the given router performing, using the translation table, a deNAT on a public destination address and public destination port included in the return communication to obtain a private destination address and private destination port; and
   when the private destination address and the private destination port respectively match the private source address and the private source port included in the communication from the client device, the given router forwarding the return communication to the client device.

6. The method of claim 1, further comprising the given router sending status information of the given router to others of the plurality of routers.

7. The method of claim 6, wherein the given router sending status information of the given router to others of the plurality of routers comprises the given router sending status information of the given router to others of the plurality of routers according to a predefined, periodic schedule or in response to detecting a change in a connection status of the given router to the first network.

8. The method of claim 6, wherein:
   the plurality of routers are connected in a bus topology;
   the given router sending status information of the given router to others of the plurality of routers comprises the given router sending status information of the given router to one or two neighbor routers connected immediately adjacent to the given router in the bus topology; and the given router receiving status information of one or more of the plurality of routers comprises the given router receiving status information from the one or two neighbor routers connected immediately adjacent to the given router in the bus topology.

9. A method of providing communication services to client devices in a transport system, the method comprising:

exchanging, among a plurality of routers in the transport system, status information of the plurality of routers, wherein the plurality of routers each include a network interface configured to communicate over a first network over which a remote server is accessible and wherein the status information for each router i includes at least one of:

a loading factor $W_i$ of the router i;

a status of a network interface of the router i to the first network;

an aggregated loading factor $WF_i$ of all routers connected, in a bus topology, forward of the router i;

a number $NF_i$ of all available routers connected, in the bus topology, forward of the router i;

an aggregated loading factor $WB_i$ of all routers connected, in the bus topology, backwards of the router i; and a number $NB_i$ of all available routers connected, in the bus topology, backwards of the router i;

calculating, by the plurality of routers, a corresponding unbalance factor $d_i$ based on the status information; and each time a client device initiates a new communication session with a given router among the plurality of routers over a second network to communicate with the remote server, determining, by the given router, whether to forward the new communication session to a neighbor router or tunnel the new communication session to the remote server over the first network based on the status information and the corresponding unbalance factor $d_i$ of the given router.

10. The method of claim 9, wherein the given router determining whether to forward the new communication session to the neighbor router or tunnel the new communication session to the remote server over the first network comprises:

the given router determining whether the status of the network interface of the given router to the first network indicates that the network interface of the given router is operational;

if the status of the network interface of the given router to the first network indicates that the network interface of the given router is operational:

the given router calculating a new unbalance factor $D_1$ for the given router that would result from the given router tunneling the new communication session to the remote server through the first network; and if the new unbalance factor $D_1$ is less than or equal to an old unbalance factor $d_1$ for the given router, the given router tunneling the new communication session to the remote server through the first network; or if the status of the network interface of the given router to the first network indicates that the network interface if the given router is not operational, or if the new unbalance factor $D_1$ is greater than the old unbalance factor $d_1$:

the given router calculating a new unbalance factor $D_2$ and $D_3$ for a first neighbor router and a second neighbor router, respectively, that would result from the first neighbor router or the second neighbor router tunneling the new communication session to the remote server through the first network, wherein each of the first neighbor router and the second neighbor router is connected immediately adjacent to the given router in the bus topology;

forwarding the new communication session to the first neighbor router if $D_2$ is smaller than $D_3$; or forwarding the new communication session to the second neighbor router if $D_3$ is smaller than $D_2$.

11. The method of claim 9, wherein the unbalance factor $d_i$ is calculated according to a formula $d_i=\max(WF_i/NF_i, W_i, WB_i/NB_i)-\min(WF_i/NF_i, W_i, WB_i/NB_i)$.

12. The method of claim 9, wherein each ongoing communication session on the given router i has a weight, and wherein the loading factor $W_i$ of the router i is a sum of the weights of all ongoing communication sessions on the router i.

13. The method of claim 12, wherein each of the plurality of routers is configured to maintain an ongoing communication session on a respective router so long as:

a difference between the loading factor of the respective router and $WF_i/NF_i$ or between the loading factor of the respective router and $WB_i/NB_i$ is less than a threshold value;

a difference between the loading factor of the respective router and a loading factor of an immediately previous neighbor router in the bus topology is smaller than the threshold value; and a difference between the loading factor of the respective router and a loading factor of an immediately next neighbor router in the bus topology is smaller than the threshold value.

14. The method of claim 13, wherein the threshold value is two times a minimum ongoing session weight of the respective router.

15. The method of claim 13, further comprising, if the difference between the loading factor of the respective router and $WF_i/NF_i$ or between the loading factor of the respective router and $WB_i/NB_i$ is greater than or equal to the threshold value:

re-routing at least one ongoing communication session from the respective router to the immediately previous neighbor router if $WF_i/NF_i$ is less than $WB_i/NB_i$; or re-routing at least one ongoing communication session from the respective router to the immediately next neighbor router if $WB_i/NB_i$ is less than $WF_i/NF_i$.

16. The method of claim 13, further comprising, if the difference between the loading factor of the respective router and the loading factor of the immediately previous neighbor router is greater than or equal to the threshold value, re-routing at least one ongoing communication session from the respective router to the immediately previous neighbor router.

17. The method of claim 13, further comprising, if the difference between the loading factor of the respective router and the loading factor of the immediately next neighbor router is greater than or equal to the threshold value, re-routing at least one ongoing communication session from the respective router to the immediately next neighbor router.

18. A router communicatively coupled to a plurality of routers in a transport system and configured to provide communication services to one or more client devices present in the transport system, wherein the router comprises:

a first network interface configured to communicate over a first network;

a second network interface configured to communicate over a second network different from the first network;

a control module configured to execute computer-executable instructions; and a non-transitory computer-readable storage medium having computer-executable instructions stored thereon that are executable by the control module to cause the router to perform operations comprising:

generating status information for the router;

receiving status information at the router from one or more of the plurality of routers; and based on the status information of the router and the status information of the one or more of the plurality of routers, routing communications between a remote server accessible through the first network and a client device connected to the router through the second network.

19. The router of claim 18, wherein the router is communicatively coupled to the plurality of routers in a bus topology over a Wireless Distribution System (WDS) network.

20. The router of claim 18, wherein:

the first network comprises a wireless wide area network (WAN), including at least one of a Universal Mobile Telecommunications System (UMTS) network, a High Speed Packet Access (HSPA) network, a Worldwide Interoperability for Microwave Access (WiMAX) network, or a 3rd Generation Partnership Project (3GPP) Long Term Evolution (LTE) network; and the second network comprises a wired or wireless local area network (LAN).

* * * * *